United States Patent

Smith

[15] 3,679,060

[45] July 25, 1972

[54] DUPLEX STRAINER CONSTRUCTION

[72] Inventor: Russell G. Smith, Cincinnati, Ohio

[73] Assignee: Xomox Corporation, Cincinnati, Ohio

[22] Filed: Sept. 8, 1970

[21] Appl. No.: 70,406

[52] U.S. Cl..............................................210/333, 210/340
[51] Int. Cl. ....................................B01d 35/12, B01d 29/38
[58] Field of Search...................210/333, 452, 340, 341, 424

[56] References Cited

UNITED STATES PATENTS

| | | | |
|---|---|---|---|
| 3,116,755 | 1/1964 | McNeal | 210/424 X |
| 3,397,784 | 8/1968 | Carr | 210/333 X |
| 2,068,468 | 1/1937 | Phillips | 210/340 X |

*Primary Examiner*—Frank A. Spear, Jr.
*Attorney*—J. Warren Kinney, Jr.

[57] ABSTRACT

The duplex strainer structure comprises two parallel elongate strainer housings flanking rotatable valving means in a common plane, the valving means being operative to place in service alternatively either of the two fluid strainers while the other undergoes cleaning. The valving members, their operating stems, and the strainer axes are arranged in coplanar relationship, to provide a compact substantially flat assembly in which the strainer housings protectively flank the valving means.

15 Claims, 4 Drawing Figures

PATENTED JUL 25 1972 3,679,060

INVENTOR
RUSSELL G. SMITH

BY J. Warren Kinney, Jr.
ATTORNEY

PATENTED JUL 25 1972  3,679,060
SHEET 2 OF 2
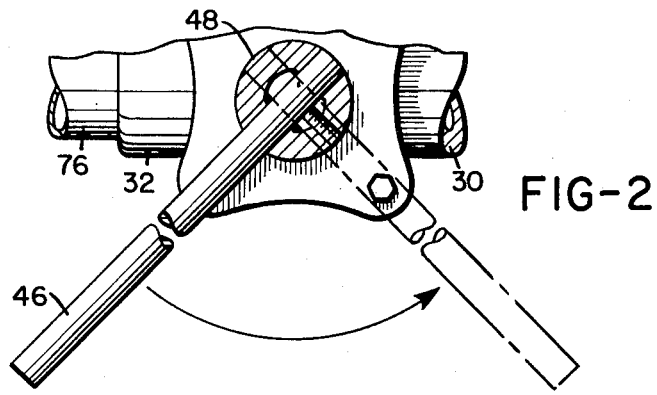
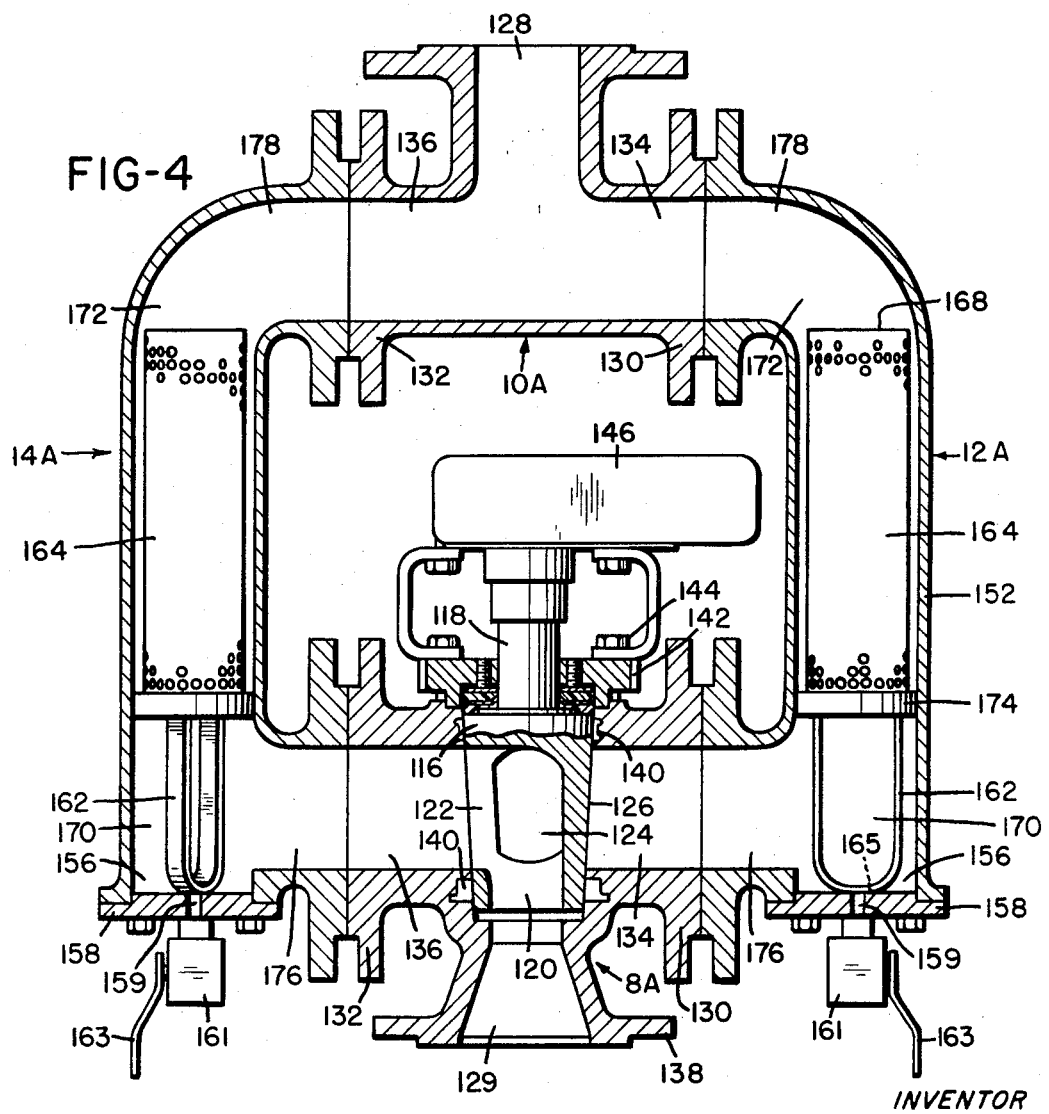
INVENTOR
RUSSELL G. SMITH
BY J. Warren Kinney Jr.
ATTORNEY

DUPLEX STRAINER CONSTRUCTION

This invention relates to a duplex strainer construction, the purpose of which is to bring into operation selectively and without difficulty, either of two strainers for removing solids or particles from liquids flowing through a pipe system.

Various types of duplex strainers have been proposed and used in the past, notably for removing solids or particles from fuel oil fed to burners or heater. As one strainer of the duplex structure became clogged or fouled, a cleaned or new strainer was readily available to substitute for the clogged or fouled strainer, the substitute strainer usually being placed in service by the manipulation of one or more valves. It was thereby made possible to clean or replace a clogged strainer while a substitute strainer continued in service.

Prior duplex strainers usually required for their construction, special valves and complex body parts which greatly increased the cost of production, and often resulted in a bulky assembly which was objectionably heavy and required considerable installation space in a piping system rendered installation of the duplex strainer practically impossible and often very difficult and expensive, due largely to the weight, bulk, and peculiar contour of the device. Under such conditions, any servicing of the strainers presented problems of access and expensive labor costs.

An object of the present invention is to provide an improved type of duplex strainer construction, which is simple, easy to install and service, and inexpensive to manufacture.

Another object of the invention is to provide a device of the character stated, which may be assembled largely with the use of standardized components which are simple and inexpensive, and which may be serviced or replaced with a minimum of labor and expense.

Another object is to achieve in an improved duplex strainer construction, the advantages of compactness and a substantially flat assembly which has an overall thickness approximating the diameter of a pipe to which it may be connected in service, thereby to greatly facilitate installation and servicing of the device, particularly under crowded conditions.

A further object of the invention is to provide a device of the character stated which employs simple and rugged conventional plug or ball type valve means, and which is so constructed and arranged that the highly durable housing components of the device embrace and protect from accidental injury or destruction the valving and actuating means therefor.

Another object of the invention is to provide an improved duplex strainer construction which includes unique back-flush and strainer basket replacement or servicing features of merit, and which operates noiselessly and efficiently.

The foregoing and other objects are attained by the means described herein and illustrated upon the accompanying drawings, in which:

FIG. 2 is a cross-section taken on line 2—2 of FIG. 1.

FIG. 4 is a vertical section of a modified form of the duplex strainer illustrated by FIG. 1.

Figure 1:
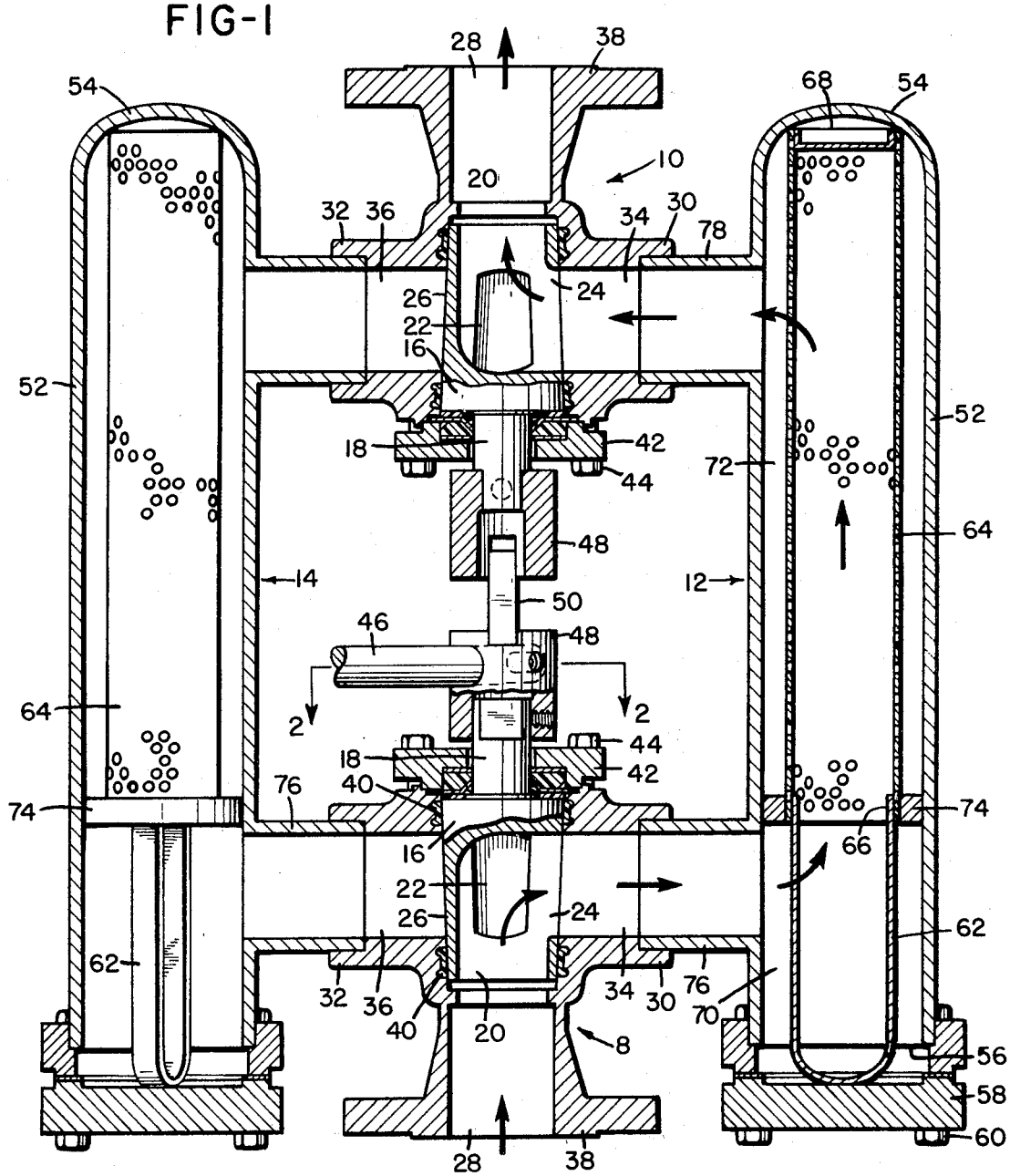
FIG. 1 is a vertical section of a duplex strainer construction embodying the improvements of the present invention.

With reference to FIG. 1, the numerals 8 and 10 indicate generally two substantially identical plug valves upon which the strainer components 12 and 14 are assembled. The valves may be of a standardized construction, and may be lined to preclude leakage and minimize corrosion, and whereas plug valves are illustrated, it should be understood that other valves, such as, by way of example, ball valves may be utilized.

Each of the valves 8 and 10 may include a valving member in the form of a rotatable valving member 16 having an operating stem 18. The valving members 16 may be tapered as shown, or straight if desired, and each has an open end passageway 20 through which a fluid may flow. Each valving member is provided also with a first port 22 and a second port 24, all preferably of uniform size and shape. The ports 22 and 24 are disposed angularly to one another, or approximately at right angles relatively, and opposite their mean location the valving member has a solid or imperforate side wall 26. The opening 20 of each valving member may be coaxial with its stem 18.

The housing or body for each valve 8, 10, may include a fluid passageway 28 which is substantially coaxial with the axis of rotation of the valving member. Each housing or body includes also a pair of lateral, aligned cylindrical necks 30 and 32 each having a fluid transfer port 34, 36, respectively. The necks 30, 32 may be integral with the flanged pipeline coupler portion 38 which forms part of the valve body. The resilient lining or sealing material in which the plug rotates is denoted 40, said material comprising TFE or FEP or the like.

The operating stem 18 of each valve is surrounded by a bonnet member 42 which usually is appropriately packed to preclude fluid leakage about the stem. The bonnet member is secured to the valve body by means of screws 44.

Means is provided to ensure rotation of the stems 18 in unison, incident to manipulation of the stem actuator. In the example shown, the actuator comprises a handle 46 swingable arcuately about the stem axes; however, other types of actuators for the purpose may be employed. The actuator may have a normally fixed mounting upon one of two stem heads 48, the heads being connected to one another by means of a key or coupler 50 which ensures the desired unitary movement of the heads and stems. The heads 48, 48 may be pinned or otherwise fixed to their respective valve stems 18, 18 as shown.

In practice, the valving members are so coordinated through the coupler 50 and heads 48, 48, that in one position of the actuator 46 ports 24, 24 of the valving member are in registry with the body ports 34, 34 while the end ports 20 are in registry with passageways 28, 28. Accordingly, a fluid entering the valve 8 at 28 will follow the path indicated by the heavy arrows, to pass through strainer component 12 and emerge through valve 10 at 28.

In a second rotated position of actuator 46 and their respective valving members, the ports 22, 22 are placed in registry with body ports 36, 36 while the solid portions 26, 26 of the valving members close off the ports 34, 34 thereby causing fluid entering valve 8 at 28 to course through the other strainer component 14 and emerge from valve 10 at its outlet port 28.

From the foregoing, it will be understood that fluid entering valve 8 at 28 can be directed through either one of the strainer components alternatively, depending upon the rotated position of actuator 46.

The strainer components 12 and 14 are similar in construction, wherefore a description of one such as 12 will suffice for the other also. The numeral 52 indicates an elongate cylindrical housing having a closed upper end 54, and a lower end opening 56 closed normally by a displaceable cap or plate 58. The cap or plate is held in position covering the opening 56, using any convenient fastening means such as screws 60. The cap is removable so as to afford access to the depending handle or bail 62 of a withdrawable cylindrical strainer 64.

The bail 62 is U-shaped in form, with the upper ends thereof fixed to the strainer element at 66. The curved end of the bail rests upon the inner face of cap 58, and resiliently abuts the cap while the upper end 68 of the strainer impinges against the inner face of housing end 54. By reason of the dome shape of strainer housing end 54, the strainer centers itself within the housing as cap 58 is tightened against the loop or lower end of the bail. The upper end 68 of the strainer may be open or closed, as desired.

Figure 3:
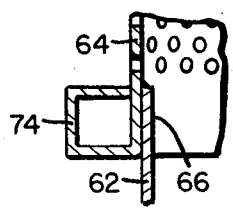
FIG. 3 is a fragmentary sectional view of part of a strainer basket.

It is important that the interior of housing 52 be divided to provide a fluid entry chamber 70, and a fluid exit chamber 72 for strained fluid. Such division of the housing is effected by a partitioning ring 74 which substantially fills the space between the strainer element and the inner wall of housing 52. As herein illustrated by way of example, ring 74 is carried by the strainer element 64, or it may be an integral part thereof, as in FIG. 3. In an alternative construction, ring 74 may be simply an annulus of metal, plastic, rubber or other suitable material applied about the strainer element, or fitted to the inner wall of housing 52. The partitioning ring should provide sufficient clearance to allow for easy removal and replacement of a strainer element with respect to the strainer housing.

Strainer housing 52 is provided with a fluid inlet tube or passageway 76 and a fluid outlet tube or passageway, 78 to interconnect with the necks 30, 30 of the valves 8 and 10, respectively. The tubes 76 and 78 extend laterally from housing 52 in a common direction, and the axes thereof rest in a common plane which includes also the axis of the housing. The relationship of components assures that the strainer components 12 and 14 and the valves and their stems will all form a substantially planar or approximately flat assembly. Such an assembly, being substantially flat in form, avoids presenting a bulky unsymmetrical shapeless mass which in many instances would aggravate crowded conditions in a compact pipe system.

The structure arranged as above disclosed facilitates installation in most pipe systems, and is easily serviced when necessary. Moreover, the housings of the strainers flank the valves 8 and 10 in such manner as to protect the valves and their accessory parts against damage from flying or swinging objects sometimes encountered around and about plants or areas in which the strainer assembly is operative. The use of conventional plug or ball valves in the assembly promotes simplicity of operation and servicing, and results in desirably minimizing the weight and bulk of the strainer structure as a whole.

The strainer construction as depicted by FIG. 4 includes many of the features of the FIG. 1 device but is distinguished therefrom in certain respects, such as the elimination of one valve, with provision made for alternate back-flushing of the strainers. The strainers of FIG. 4, denoted 164, may be similar to the strainers 64, and require a closed or strainer-type end 168 opposite the bail or handle 162. The partitioning ring is denoted 174, and separates the fluid entry chamber 170 from the fluid exit chamber 172.

The strainer components 12A and 14A are similar to one another, wherefore a description of one such as 12A should suffice for the other also.

In FIG. 4, the strainer housing 152 includes a pair of lateral passageways or tubes 176 and 178, the axes of which are parallel to one another and reside in a plane which includes also the axis of the elongate housing 152 and that of operating stem 118. The lateral passageways of tubes 178, 178 are in fluid communication with the ports 134 and 136 of the opposed necks 130 and 132, respectively, of a T-fitting 10A which has a fluid outlet port 128.

Valve 8A is illustrated as a rotary plug valve; however, it could just as easily be a ball valve. The said valve has a fluid inlet port or passageway 129 which feeds fluid into the open end passageway 120 of the rotatable valving member 116. The valving member 116 has also a first port 122 and a second port 124, preferably of uniform size and shape. The ports 122 and 124 are disposed angularly to one another, or approximately at right angles relatively, and opposite their mean location the member has a solid or imperforate side wall 126. The opening 120 of the member may be coaxial with its stem 118.

The housing or body of valve 8A includes the fluid inlet port or passageway 129 which is substantially coaxial with the axis of rotation valving member 116. The valve body includes also a pair of lateral, aligned cylindrical necks 130 and 132 having fluid transfer ports 134, 136. The necks 130 and 132 may be integral with the flanged pipeline coupler portion 138 which forms part of the valve body. The lining or sealing material in which the valving member rotates is denoted 140, and comprises TFE, FEP or the like. The operating stem 118 of valve 8A is surrounded by a bonnet member 142 which is appropriately packed to preclude fluid leakage about the stem. The bonnet member may be secured to the valve body by means of screws 144 or otherwise.

Manual means, not illustrated, may be provided for rotating the operating stem 118, or power means denoted generally by the numeral 146 may be associated with the stem axis for rotating the valving member, whether ball or plug, or if desired, other types of actuators for the purpose may be employed.

With further reference to FIG. 4, each strainer housing has an opening 156 in alignment with the major axis thereof, closed by a cap or plate 158, the opening 156 being large enough to permit bodily withdrawal of strainer 164 therethrough upon removal of the cap or plate as taught by FIG. 1.

According to FIG. 4, the cap or plate 158 of each strainer housing may be provided with a back-flush port 159, 159 said port being normally closed by a blow-off valve 161. The valves 161 may be manipulated in any suitable manner, as by means of handles 163, or automatic operators if desired. The strainer bails 162 are perforated as at 165, or they may be appropriately deformed at the loop end thereof, so as to avoid interference with discharge of fluid through a port 159 when its controlling valve 161 is opened.

From the disclosure of FIG. 4, it will be apparent that a flow of fluid passing upwardly through valve inlet 129 will be directed through valving member port 122 and into the chamber 170 of strainer component 14A. After straining, the fluid will course upwardly and into fitting 10A, leaving by way of port 128 to enter a pipe system connected to said port 128. Normally, the blow-off valve 161 of strainer component 12A will be closed, and any fluid therein will be quiescent particularly since the valving member wall 126 prevents flow of fluid into the strainer housing of component 12A.

If now the serviceman wishes to back-flush the strainer 164 at the right in FIG. 4, he need only open the blow-off valve associated with that strainer housing, whereupon some of the fluid from 14A will pass over through fitting 10A and course downwardly through 12A to leave the strainer housing through the open valve port 159 at the right in FIG. 4. The resultant reverse flow of fluid through the strainer at 12A will back-flush and clean the strainer. The strainer so cleaned may then be placed in service by rotating the valving member 116 to close off the port 136 and open the port 134, which latter port directs fluid upwardly through the strainer of component 12A and into the pipe system through the ports 134 and 128 of fitting 10A.

Subsequently, when the strainer of component 12A shows signs of becoming fouled or clogged, the serviceman may place in service the strainer at the left in FIG. 4, by restoring the valving member to the FIG. 4 position and opening the blow-off valve 161 at the right in FIG. 4. This will back-flush the strainer of component 12A in readiness for a future period of use.

From the foregoing, it will be apparent that the duplex strainer of FIG. 4 may serve continuously and without interruption, to strain liquids supplied continuously to a pipe system or the like, with a minimum of effort and manipulation. The device, when necessary, may be cleaned by physical removal of the strainers, this being accomplished by detaching the plates or covers 158, 158. The constituent parts may be formed of metals or materials resistant to corrosion and wear, depending upon the nature of the fluid treated and the conditions of usage involved.

It should be understood that the subject invention contemplates the use of ball valves as valving means, in lieu of the plug valves, as illustrated. The invention likewise contemplates the use of one plug valve and one ball valve in the structure of FIG. 1 in which two valving means are disclosed.

WHAT IS CLAIMED IS:

1. A duplex strainer construction for straining a fluid under pressure comprising a pair of elongate housings each having an elongate interior chamber, each housing having an inlet and an outlet adjacent each end thereof, each housing having a closed end and an open end, closure means closing the open end, each housing having a smooth inner surface throughout its length, fluid transfer ports in communication with the inlets and outlets of each housing, at least one valve housing in communication with each housing, a rotatable valve in the valve housing, operable means extending from the valve housing to rotate the valve, the valve housing being in communication with a conduit containing the fluid under pressure, the valve selectively controlling flow of the fluid alternatively to one of the housings, a fitting connected to the outlets of each of the housings and to a second conduit for conducting the fluid to point of use, an elongate strainer in each housing, each strainer having a closed end adjacent the outlet of the housing and an open end adjacent the inlet of the housing, a handle connected to each strainer adjacent the open end, the handle engaging each closure means for the open ends of each housing and supporting each strainer in each housing, a partitioning ring in each housing having inner and outer surfaces, the outer surface engaging the inner surface of each housing and the inner surface engaging an outer wall of each strainer adjacent the open end, the ring preventing flow into each chamber except through the open end of each strainer so that the liquid entering the chamber will pass into each strainer before exiting through the outlet of each housing.

2. The combination as defined by claim 1, wherein the aforesaid fluid transfer ports of both strainer housing chambers reside substantially in a plane common to and including the axes of both strainer housings and the axis of rotation of said rotatable valve.

3. The combination as defined by claim 1 wherein said closed end of the fluid strainer is forced against the closed end of the elongate housing by contact of the strainer handle with said displaceable cap.

4. The combination as defined by claim 3, wherein said closed end of the strainer is substantially circular and said closed end of the housing is domed internally, for self-centering of the strainer within the housing incident to application of said cap.

5. The combination as defined by claim 1, wherein is included a normally closed blow-off valve near the open end of each strainer housing, for relief of back-flush fluid from said chambers.

6. The combination as defined by claim 5, wherein said blow-off valves are carried by said displaceable caps.

7. The combination as defined by claim 5, wherein is included means for substantially centering and spacing the fluid strainers relative to the chamber side wall.

8. The combination as defined by claim 1, wherein the valve comprises a plug valve.

9. The combination of claim 1, wherein the valve comprises a ball valve.

10. The combinations as defined by claim 1, wherein is included remotely operable power means for rotating said valve.

11. The strainer as set forth in claim 1, wherein a rotating valve is mounted in the fitting connected to the outlets, a second operable means extending from the fitting to rotate the valve.

12. The combination as defined by claim 11, wherein is included a coupler joining the operating means of both valves for rotation in unison.

13. The combination as defined by claim 11, wherein the aforesaid fluid transfer ports of both strainer housing chambers reside substantially in a plane common to and including the axes of both strainer housings and the axes of rotation of both rotatable valves.

14. The combination as defined by claim 13, wherein the operating means of the valving members are coaxial, and the combination includes a coupler joining said operating means to enforce rotation in unison of said stems and said valving members.

15. The combination as defined by claim 14, wherein the aforesaid conduit for receiving a flow of fluid and the aforesaid second conduit to discharge strained fluid are substantially coaxial with the operating stems of the valving means.

* * * * *